(12) United States Patent
Laou (10) Patent No.: US 6,198,098 B1
(45) Date of Patent: Mar. 6, 2001

(54) MICROSTRUCTURE FOR INFRARED DETECTOR AND METHOD OF MAKING SAME

(76) Inventor: Philips Laou, 4980 Langelier, Montreal, Quebec (CA), H1M 2A1

( * ) Notice: Subject to any disclaimer, the term of this patent is extended or adjusted under 35 U.S.C. 154(b) by 0 days.

(21) Appl. No.: 09/085,267

(22) Filed: May 26, 1998

(51) Int. Cl.[7] .................................................. H01L 31/09
(52) U.S. Cl. .................... 250/338.1; 250/332; 250/338.4
(58) Field of Search ................................ 250/332, 338.4, 250/338.1

(56) References Cited

U.S. PATENT DOCUMENTS

| | | | |
|---|---|---|---|
| 5,399,897 | * | 3/1995 | Cunningham et al. ............... 257/467 |
| 5,698,852 | * | 12/1997 | Tanaka et al. ........................ 250/332 |
| 5,777,328 | * | 7/1998 | Gooch ................................ 250/338.4 |

* cited by examiner

*Primary Examiner*—Constantine Hannaher (57) ABSTRACT

Microstructure for bolometer for high infrared sensitivity and detectivity having a corrugated air bridge microstructure which provides a large area, low infrared reflection and large infrared absorption so as to increase the sensitivity and detectivity.

15 Claims, 5 Drawing Sheets

MICROSTRUCTURE FOR INFRARED DETECTOR AND METHOD OF MAKING SAME

FIELD OF INVENTION

The field of the invention is in a high sensitivity microstructure bolometer with a corrugated air bridge, which consists of at least a layer of temperature responsive resistive material for infrared detection, which provides large area, low infrared reflection and large infrared absorption so as to increase sensitivity and detectivity.

BACKGROUND OF THE INVENTION

An infrared energy detector is a device which produces an output signal which is a function of the amount of infrared energy that is impinging on an active region of the detector. There are two types of infrared detectors, photon detectors and thermal detectors.

Photon detectors function based upon the number of photons that are impinging on a transducer region of the detector. Photon detectors for infrared radiation are typically made of small band gap (about 0.1–0.2 eV) semiconductors such as HgCdTe and these detectors operate as photodiodes or photocapacitors by photon absorption to produce electron-hole pairs. Photon detectors are relatively sensitive and have a high response speed compared to thermal detectors. However, the small band gap is only about 4KT at room temperature and as a result dark current swamps any detectable signals. Photon detectors operate well only at low temperatures and therefore require refrigeration by liquid nitrogen (LN) to provide sensitive detection. Moreover, for wavelength greater than 20 μm, there is no satisfactory cooled detector technology above liquid helium (LHe) temperatures.

Thermal detectors function based upon a change in the temperature of the transducer region of the detector due to absorption of the infrared radiation. Thermal detectors provide an output signal that is proportional to the temperature of the transducer region. Since radiation absorption usually occurs over a wide range of wavelengths, thermal detectors are typically responsive over a wide range of wavelengths.

A bolometer is a thermal detector for infrared detection having a transducer region made of a material which has its resistivity change as the temperature of the material increases in response to the infrared energy impinging on, and absorbed by, the material Thus, in response to the change of resistance, by connecting the material to a constant voltage supply, the electrical current through the material will vary in accordance with the infrared energy sensed by the material or by connecting the material to a constant current supply, the electrical voltage across the material will vary in accordance with the infrared energy sensed by the material. Monolithic electronic circuitry connected to the material is used to produce an output signal representative of the infrared energy impinging on the material. By arranging an array of bolometers, together with its output electrical signals, and a processor fed by the output electrical signals can thus be used to provide an electronic image of the source of the infrared energy.

In such application, the infrared sensitive materials are deposited on and the integrated circuitry is fabricated on a substrate or a layer of semiconductor. Most of the infrared sensitive materials of bolometers are suspended on the elevated, air bridging surface member from the substrate by semiconductor micromachining technology to thereby increase its thermal isolation from the substrate. The increased thermal isolation thereby increases the sensitivity of the bolometer to the impinging infrared energy. For example, see U.S. Pat. No. 5,369,280 (Liddiard).

The voltage responsivity of a bolometer, $R_v$, is defined as:

$$R_V = \frac{I_b R \beta \eta}{(G(1+\omega^2\tau^2))^{1/2}}$$

where $I_b$ is the bias current, R is the dc resistance, η is the absorptivity, G is the thermal conductance between sensitive element and the substrate, ω is the angular modulation frequency of the incident radiation and τ is the thermal response time, which is given by C/G. C is the heat capacity (thermal mass) of the sensitive element. β is the temperature coefficient of resistance (TCR) and defined as:

$$\beta = \frac{1}{R}\frac{dR}{dT}$$

where T is the temperature. Therefore, for high responsivity, high dR/dT, low G and low ω (ωτ<<1) are required. Solid state micromachining techniques can be employed to create an air bridge under the infrared sensitive element to provide low thermal conductance.

The detectivity D* is determined by the ratio of the responsivity $R_v$ to the noise voltage $V_n$:

$$D^* = \frac{R_V \sqrt{\Delta f A}}{\Delta V_n}$$

where Δf is the amplifier frequency bandwidth, $\Delta V_n$ is the total noise voltage of the detector, and A is the area of the active region of the detector.

The bolometers can be operated under room temperature, however, these thermal detectors typically have a lower sensitivity and a slower response speed than photon detectors. Accordingly, the improvement in the present invention is directed to a structure which increases the bolometer sensitivity, detectivity and reduces the infrared radiation loss due to reflection.

SUMMARY OF THE INVENTION

It is an object of the invention to provide an improved microstructure for bolometer.

It is also another object of the invention to provide a microstructure for bolometer having a corrugated air bridge which consists of at least a layer of infrared radiation sensitive material, such structure having improved infrared absorptivity and sensitivity.

It is a further object of the invention to provide a microstructure for bolometer having a corrugated air bridge which has improved structural integrity.

It is yet another object of the invention to provide a microstructure for bolometer having a corrugated air bridge which provides large active area.

These and other objects of the invention are attained generally by providing a corrugated air bridge microstructure which consists of at least a layer of infrared sensitive material formed on a semiconductor layer or substrate. An electrical device having this corrugated air bridge microstructure suspended over the substrate is connected to a monolithic electronic circuit or to a hybrid electronic circuit via electrical contacts. In a first preferred embodiment of the invention, the electrical device is a bolometer and the electronic circuit is a readout circuit for the device. The bolometer includes a surface member and two pillars. The surface member is suspended over the surface of the substrate by the two pillars as an air bridge structure. Preferably the surface member is corrugated. A layer of infrared sensitive material which has its resistivity change as the temperature of the material increases in response to the infrared energy impinging on, and absorbed by, the material is formed over the corrugated surface member. Thus, in response to the change of resistance, by connecting the infrared sensitive material to a constant voltage supply, the electrical current through the material varies in accordance with the infrared energy sensed by the material or by connecting the infrared sensitive material to a constant current supply, the electrical voltage across the material will vary in accordance with the infrared energy sensed by the material. The monolithic electronic readout circuit connected to the two electrical contacts at the proximate ends on the infrared sensitive material is used to produce an output signal representative of the infrared energy impinging on the material.

In a second preferred embodiment of the invention, the electrical device is a bolometer and the electronic circuit is a readout circuit for the device. The bolometer includes a surface member and two pillars. The surface member is suspended over the surface of the substrate by the two pillars as an air bridge structure. Preferably the surface member is corrugated. A first layer of infrared sensitive material which has its temperature change in response to the infrared energy absorbed by the material is formed over the corrugated surface member. A layer of electrical insulating layer is formed on the first infrared sensitive material A second layer of infrared sensitive material which has its resistivity change as the temperature of the second layer of infrared sensitive material increases in response to both the infrared energy impinging on, and absorbed by, the second layer of infrared sensitive material and the temperature change of the first infrared sensitive material is formed on the electrical insulating layer. Thus, in response to the change of resistance of the second infrared sensitive material, by connecting the second infrared sensitive material to a constant voltage supply, the electrical current through the material varies in accordance with the infrared energy sensed by the material or by connecting the second infrared sensitive material to a constant current supply, the electrical voltage across the material will vary in accordance with the infrared energy sensed by the material. The monolithic electronic readout circuit connected to the two electrical contacts at the proximate ends on the second infrared sensitive material is used to produce an output signal representative of the infrared energy impinging on the material.

In the first preferred embodiment, the suspended surface member may be silicon dioxide or silicon nitride and the infrared sensitive material may be made of nickel iron alloy. In the second preferred embodiment, the suspended surface member may be silicon dioxide or silicon nitride and the first infrared sensitive material may be made of nickel iron alloy. The electrical insulator layer may be silicon dioxide or silicon nitride. The second layer of infrared sensitive material which maximizes TCR or thermal resistance dependence may be amorphous silicon, germanium or a layer of low temperature superconductor or high temperature superconductor. This second layer of infrared sensitive material may also be metal oxides which maximize TCR such as vanadium oxide.

With such arrangement in the two preferred embodiments, the corrugated bridge has a large active area exposed to incoming infrared radiation compared to planar type air bridge or platform. This increases the bolometer detectivity since detectivity is directly proportional to the square root of the active area of the bolometers. Moreover, infrared radiation will pass through the infrared sensitive material layers more than the one or two times possible with the corrugated structure. This reduces the infrared radiation loss due to reflection hence increases the infrared absorption. This corrugated structure also provides a suspended microstructure with low residual stress which is important to improve structural integrity. One of the main advantages of the invention is that these improvements provided by the corrugated air bridge structure can benefit all kinds of bolometer. These bolometers include uncooled metal bolometers, metal oxide bolometers, cooled and uncooled semiconductor bolometers and cooled high temperature superconductor (HTC) and low temperature superconductor (LTC) bolometers. It is yet one of the main advantages of the invention is that the corrugated air bridge structure can be easily made using micromachining technologies.

In accordance with the first preferred embodiment in the invention, a method of forming a bolometer with a corrugated air bridge suspended over a layer of semiconductor or a substrate by two pillars which also provide electrical connection to a monolithic electronic readout circuit is provided. In the first preferred embodiment, the method comprises the steps of: providing a substrate; forming a first layer on the substrate surface; patterning the first layer for the corrugated surface formation; forming a corrugated surface by etching the substrate using the first layer as an etching mask; removing the first layer on the corrugated surface; forming a second layer on the corrugated surface and this second layer is for the corrugated surface member and for the formation of two pillars; patterning the second layer for the corrugated surface member and the two pillars; removing the substrate material beneath the second layer to release the corrugated surface member and form the two pillars by etching; forming a third layer on the suspended corrugated surface member; and forming electrically connection at the proximate ends of the third layer and a monolithic electronic readout circuit.

In accordance with the second preferred embodiment in the invention, a method of forming a bolometer with a corrugated air bridge suspended over a layer of semiconductor or a substrate by two pillars which also provide electrical connection to a monolithic electronic readout circuit is provided. In the second preferred embodiment, the method comprises the steps of: providing a substrate; forming a first layer on the substrate surface; patterning the first layer for the corrugated surface formation; forming a corrugated surface by etching the substrate using the first layer as an etching mask; removing the first layer on the corrugated surface; forming a second layer on the corrugated surface and this second layer is for the corrugated surface member and for the formation of two pillars; patterning the second layer for the corrugated surface member and the two pillars; removing the substrate material beneath the second layer to release the corrugated surface member and form the two pillars by etching; forming a third layer on the suspended corrugated surface member; forming a fourth layer on the third layer; forming a fifth layer on the fourth layer; and forming electrically connection at the proximate ends of the fifth layer and a monolithic electronic readout circuit.

DESCRIPTION OF DRAWINGS

The invention will be described in greater detail with reference to the following drawings where.

Corresponding numericals and symbols in the different figures refer to corresponding parts unless otherwise indicated.

DETAILED DESCRIPTION OF THE PREFERRED EMBODIMENTS

The making and use of the presently preferred embodiments are discussed below in detail. However, it should be appreciated that the invention presented provides many applicable inventive concepts which can be widely embodied in a variety of specific contexts. The specific embodiments discussed are merely illustrative of specific ways to make and use the invention, and do not limit the scope of the invention.

Figure 1:
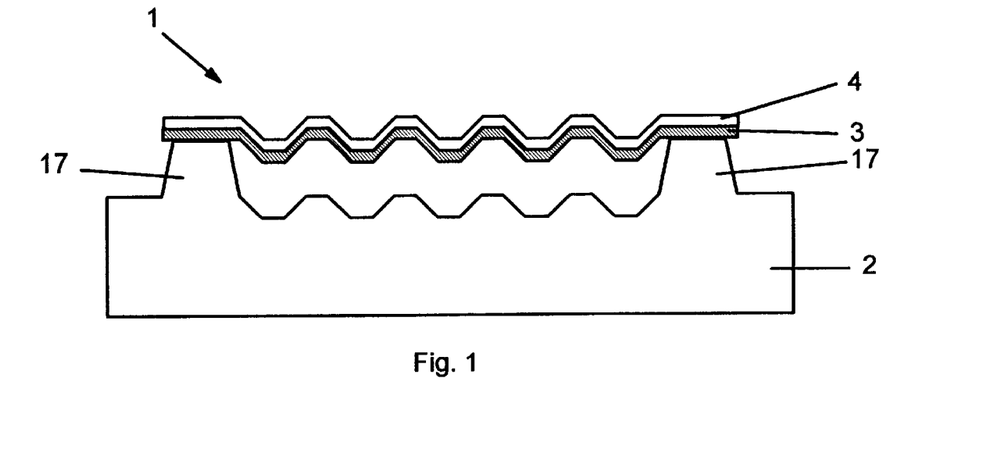
FIG. 1 shows a schematic view of a microstructure design of a first preferred embodiment single bolometer cell.

FIG. 1 illustrates a cross section view of a first preferred embodiment microstructure for a single bolometer cell. In this structure, a supporting layer, 3, on which is a layer of infrared sensitive material 4, according to the invention. The supporting layer 3 and infrared sensitive material layer 4 form the transducer structure 1 which is suspended by two pillars, 17, extended from the substrate 2. The substrate 2 may be a semiconductor substrate which may include the electronic circuitry such as diodes, bus lines, connections and contact pads (not shown) to detect the electrical signal. The fabrication of these components follows conventional silicon IC technology. The electronic circuitry is connected at the proximate ends on the infrared sensitive material layer 4 on top of the pillars, 17, by wire bonding to send and receive signals from the infrared sensitive material layer 4. Preferably, the transducer structure 1 is corrugated. The supporting layer 3 is an insulator. According to the invention, the substrate 2 is a monocrystalline silicon substrate having a (100) surface orientation, of the type employed for the manufacture of the integrated circuit. The supporting layer 3 is silicon dioxide and the infrared sensitive material layer 4 is Ni.

Figure 2:
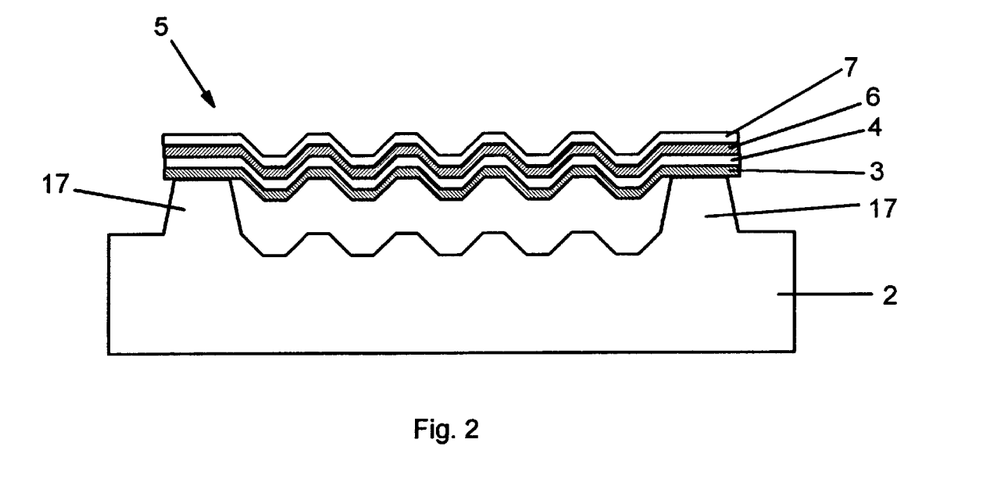
FIG. 2 shows a schematic view of a microstructure design of a second preferred embodiment single bolometer cell.
Figure 3:
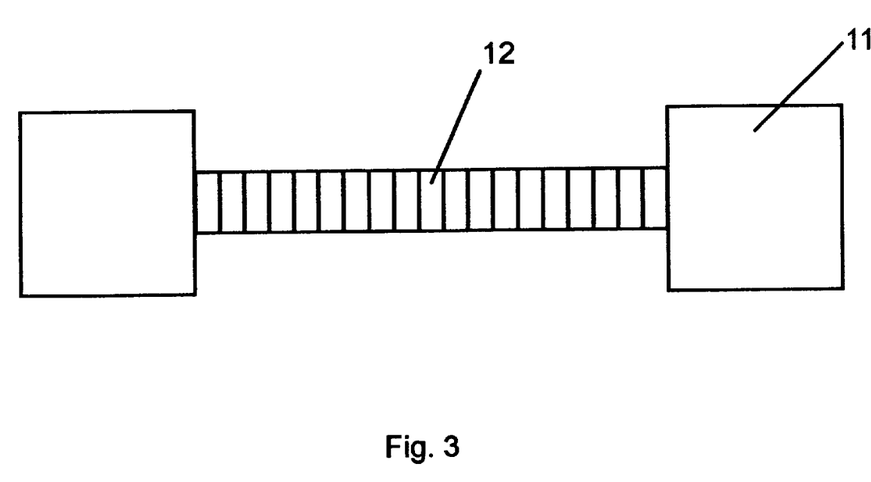
FIGS. 3–4 show top-views of two preferred embodiment single bolometer cells.
Figure 4:
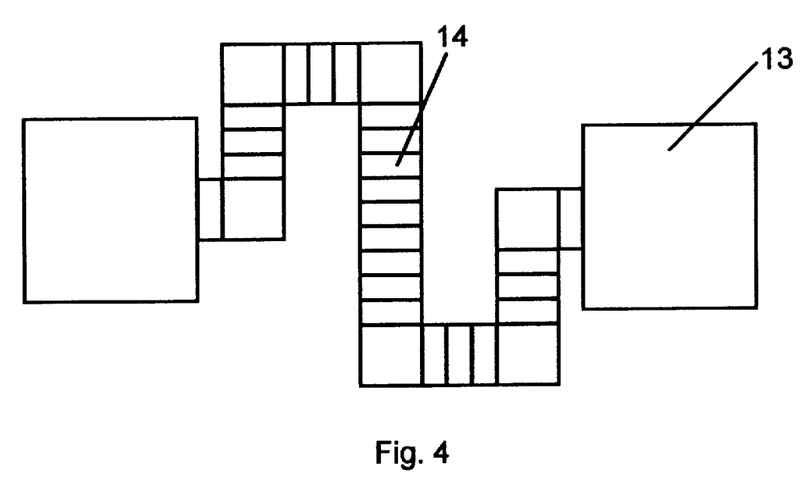

FIG. 2 illustrates a cross section view of a second preferred embodiment microstructure for a single bolometer cell In this structure, a first supporting layer, 3, on which is a first layer of infrared sensitive material, 4, on which is a second supporting layer, 6, on which is a second layer of infrared sensitive material, 7, according to the invention. The supporting layers 3 and 6 and infrared sensitive material layers 4 and 7 form the transducer structure 5 which is suspended by two pillars, 17, extended from the substrate 2. The substrate 2 may be a semiconductor substrate which includes the integrated circuit to detect the electrical signal. The electronic circuitry is connected at the proximate ends on the infrared sensitive material layer 7 on top of the pillars, 17, by wire bonding to send and receive signals from the infrared sensitive material layer 7. Preferably, the transducer structure 5 is corrugated. The supporting layers 3 and 6 are insulator. According to the invention, the substrate 2 is a monocrystalline silicon substrate having a (100) surface orientation, of the type employed for the manufacture of the integrated circuit. The first and the second supporting layers, 3 and 6, are silicon dioxide. The first infrared sensitive material layer, 4, is Ni. The second infrared sensitive material layer 7 is germanium FIGS. 3 and 4 are top views of the preferred transducer structure 1 or 5, including the two bonding pads on the infrared sensitive material layer 4 or 7 on top of the pillars, 17.

The transducer structures 1 and 5 are corrugated in order to increase the active area of the transducer, reduce the radiation reflection and increase the radiation absorption thereby provide the bolometer cell with a high responsivity and detectivity compared to the usual flat transducer structure. The transducer structure 1 and 5 are also suspended from substrate 2 in order to provide increased thermal isolation to thereby provide the bolometer cell with a high responsivity and detectivity.

A method for fabricating a bolometer cell with corrugated transducer structure suspended from the substrate is discussed with reference to FIG. 5 to FIG. 11.

Figure 5:
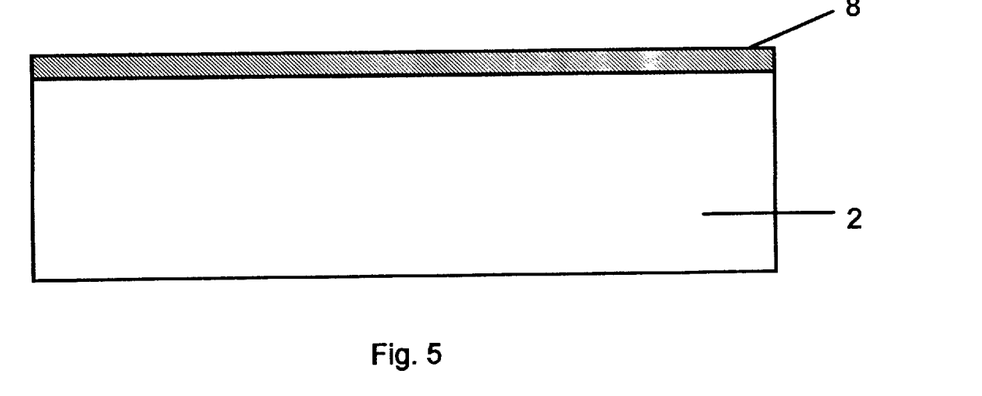
FIGS. 5–11 are cross-sectional views to aid in the understanding of an exemplary fabrication process.
Figure 6:
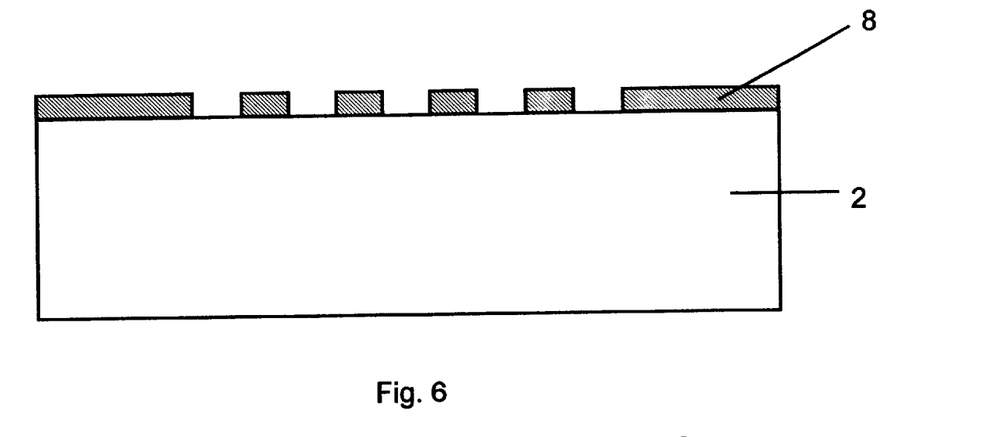
Figure 7:
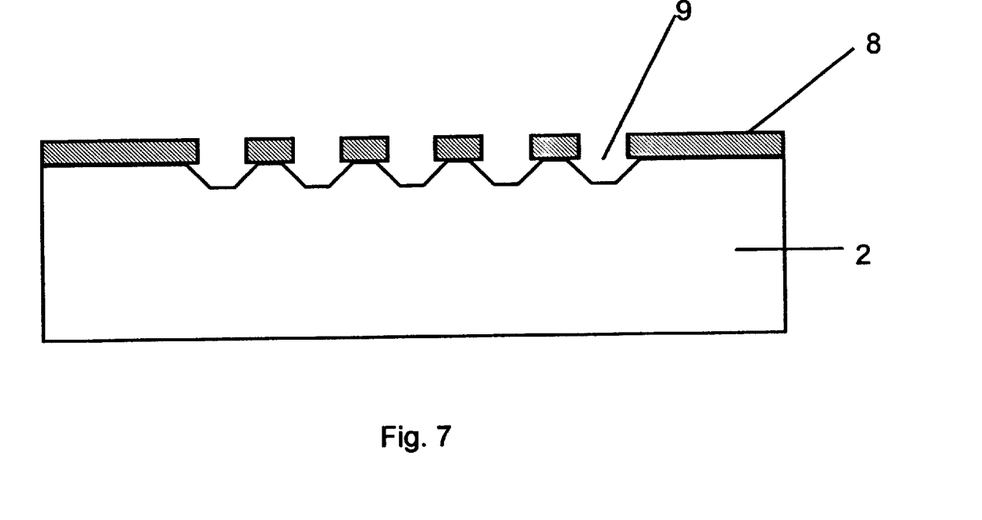
Figure 8:
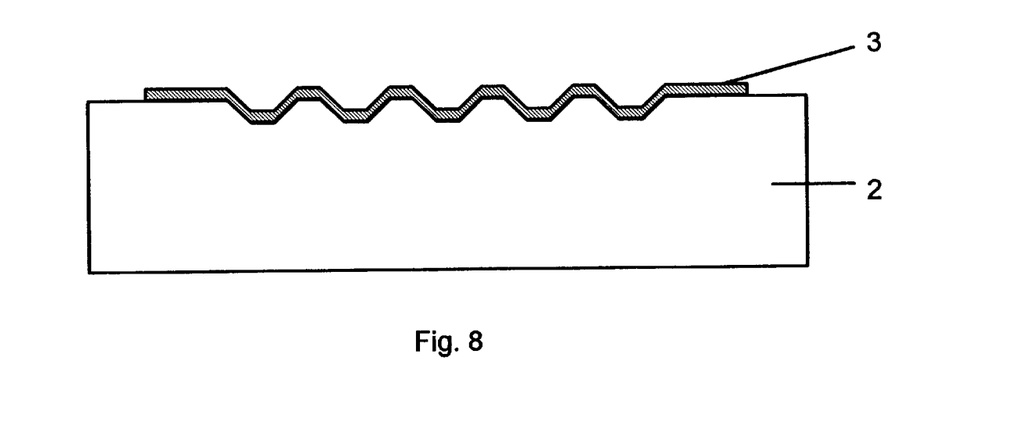
Figure 9:
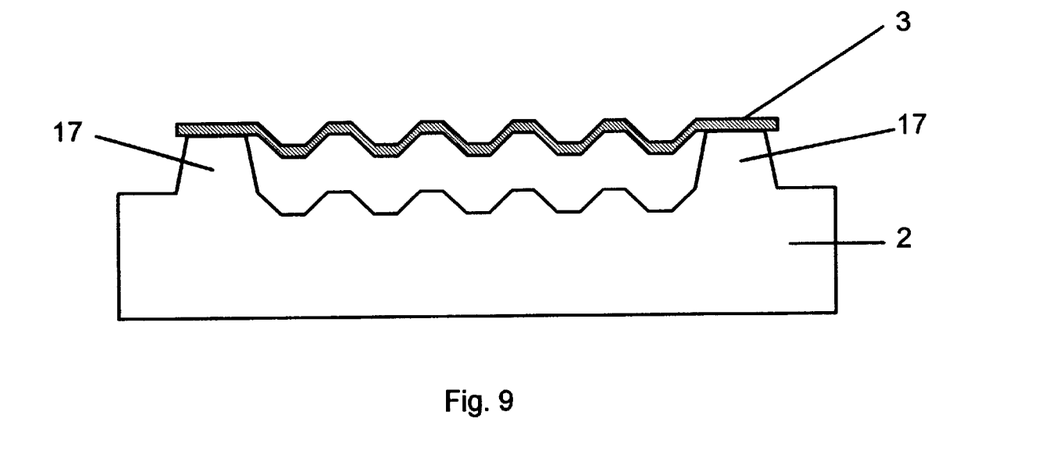

For the first preferred embodiment, a first layer of silicon dioxide, 8, is formed on a silicon substrate, 2, with a (100) surface orientation by oxidation as shown in FIG. 5. The thickness of the oxide is about 0.5 $\mu$m. The oxide is then patterned using standard photolithography as shown in FIG. 6. After this window opening step, a first silicon etching process is carried out. The etching method may be wet chemical etching, and the solution, which etches isotropically, may be a mixture of nitric acid, acetic acid and hydrofluoric acid with a volume composition of 25 to 10 to 1 at room temperature; or if the solution, etches anisotropically, under the dielectric material layer, 8, the {111} facets should allow for a 54.7° side angle. The solution may be a mixture of potassium hydroxide and water with a weight composition of 10.5 grams to 14.5 grams at 60° C. After the first silicon etching step, silicon steps, 9, in the order of about 5 $\mu$m each are formed along where the corrugated bridge will locate as shown in FIG. 7. The first layer of silicon dioxide, 8, is then removed by buffered HF solution. A second layer of silicon dioxide, 3, is formed on the substrate, 2, by oxidation. This layer of oxide, 3, is then patterned to define the bridge and pillar pads as shown in FIG. 8 with corresponding top views shown in FIG. 3 or FIG. 4. A second silicon etching process is carried out. The etching method may be wet chemical etching, and the solution, which etches isotropically, may be a mixture of nitric acid, acetic acid and hydrofluoric acid with a volume composition of 25 to 10 to 1 at room temperature; or if the solution, etches anisotropically, under the dielectric material layer, 8, the {111} facets should allow for a 54.7° side angle. The solution may be a mixture of potassium hydroxide and water with a weight composition of 10.5 grams to 14.5 grams at 60° C. The second silicon etching process is to remove silicon under the bridge region so that the bridge is suspended from the substrate, 2, by the two pillars, 17, formed on the substrate as shown in FIG. 9, to increase thermal isolation. After the second silicon etching, a layer of Ni, 4, with a thickness of about 100 nm is evaporated on the silicon dioxide layer, 3, and on the entire substrate. This layer of Ni, 4, serves as the infrared absorbing material The variation of resistance of this Ni layer, 4, due to the change of its temperature caused by infrared radiation is then interpreted as electrical signals and these signals are collected by an integrated circuit connected to the electrical contacts at the proximate ends of the Ni layer, 4, on top of the pillars, 17, by wire bonding. The first preferred embodiment of a single bolometer cell is completed as shown in FIG. 1.

Figure 10:
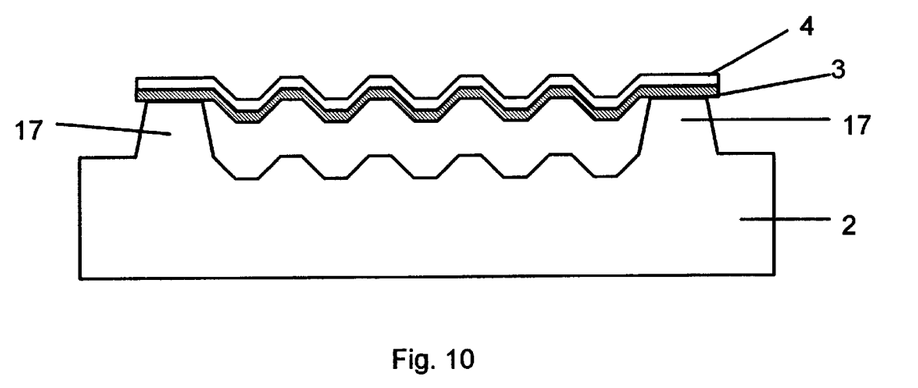
Figure 11:
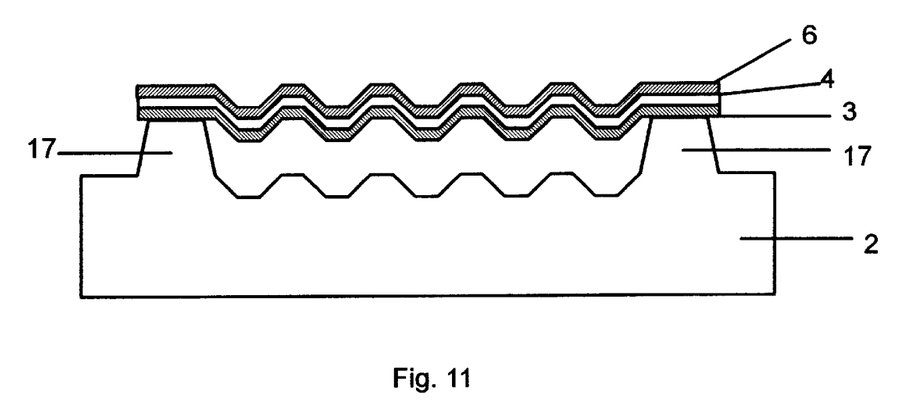

The fabrication of the second preferred embodiment is the continuation of that of the first preferred embodiment. After the Ni layer, 4, evaporation as shown in FIG. 1 or FIG. 10, a layer of silicon dioxide, 6, with a thickness of about 0.2 µm, is evaporated on the Ni layer, 4, and on the entire substrate as shown in FIG. 11. A layer of germanium, 7, with a thickness of about 100 µnm, is then evaporated on the silicon dioxide layer, 6 as shown in FIG. 2. The layer of Ni, 4, serves as the infrared absorbing material. The variation of resistance of the germanium layer, 10, due to both the change of temperature of the Ni layer, 4, caused by infrared radiation and the change of temperature of the germanium layer, 10, caused by infrared radiation, is then interpreted as electrical signals and these signals are collected by an integrated circuit connected to the electrical contacts at the proximate ends on the germanium layer, 10, on top of the pillars, 17, by wire bonding. The second preferred embodiment of a single bolometer cell is completed as shown in FIG. 2.

It is noted that the multi-infrared sensitive material configuration is to optimize the infrared detection. The Ni layer, 4, absorbs most of the infrared radiation, however, the TCR of Ni is not as high as germanium. On the other hand, the germanium layer, 10, has a relatively high TCR but most of the infrared radiation is not absorbed by germanium due to its large energy band gap. By sandwiching these two materials, the change of temperature on the Ni layer, 4, due to infrared absorption will be detected by the germanium layer, 10, which causes a large change of resistance due to its high TCR.

It is yet to be noted that although materials have been selected for different purposes during the fabrication, it should be appreciated that other materials can also be used. For example, the first layer of infrared sensitive material, 4, may be Pt, Ti or Cr. The silicon dioxide layers, 3 and 6, can be silicon nitride. The second layer of infrared sensitive material, 7, can be amorphous Si or metal oxides.

It is also noted that the preferred transducer structure 1 or 5 shown in FIGS. 3 and 4 are examples in the invention and the transducer structure may be any configurations with two contact regions and a suspended corrugated active region.

It is also noted that although the description is basically in terms of individual bolometer cell or pixel, the invention is directed for use to an x,y array assembly of adjoining pixels forming an imaging or mosaic detector array.

It is further to be noted that the invention is not restricted to wet chemical etching. Various etching methods, for example, reactive ion etching or plasma etching, may be used to create the underetching step at the first etching step and the formation of the suspended bridge at the second etching step.

It is yet to be noted that the described fabrication procedure does not optimize the performance of the bolometer cell. Different depth of etched step or thickness of the infrared sensitivity material layer on the corrugated bridge may further improve the infrared sensitivity.

It is also noted that the corrugated air bridge may be created by other semiconductor micromachining techniques such as using silicon separated by implanted oxygen (SIMOX) as the substrate of the bolometer cell or using polyimide to form the corrugated sacrificial layer structure on which the infrared sensitive material is deposited, and the polyimide layer is removed by oxygen or argon plasma etching.

Obviously, numerous modifications and variations of the present invention are possible in light of the above teachings. It is therefore to be understood that within the scope of the appended claims, the invention may be practiced otherwise than as specifically described herein.

What is claimed is:

1. A microbridge bolometer structure for detecting infrared radiation with multiple corrugated regions and with increased active area and with reduced reflection comprising:
   a bolometer structure on a semiconductor substrate, said structure having a lower section on the surface of the substrate and a microbridge upper detector structure spaced from and immediately above the lower section;
   two pillars formed on the said substrate to support said upper microbridge detector structure;
   said upper microbridge detector structure comprising multiple corrugated regions for increasing said active area and reducing said reflection, a sandwich structure including a first supporting dielectric layer on which a first thin film temperature responsive resistive element having first and second terminals is formed;
   said first and second terminals formed on the proximate ends of said first thin film temperature responsive resistive element on the said multiple corrugated regions;
   electrically conductive paths from said first and second terminals to an electronic readout circuit by wire bonding.

2. The microbridge structure with multiple corrugated regions and with reduced reflection according to claim 1 wherein said each corrugated region consists of etched step on the order of 5 µm in depth.

3. The microbridge structure with multiple corrugated regions and with reduced reflection according to claim 1 wherein said first supporting dielectric layer is selected from the group consisting of silicon dioxide and silicon nitride.

4. The microbridge structure with multiple corrugated regions and with reduced reflection according to claim 1 wherein said first supporting dielectric layer is silicon dioxide.

5. The microbridge structure with multiple corrugated regions and with reduced reflection according to claim 4 wherein said first supporting dielectric layer is on the order of 1 µm in thickness.

6. The microbridge structure with multiple corrugated regions and with reduced reflection according to claim 1 wherein said first thin film temperature responsive resistive element is selected from the group consisting of Ni, Ti, Pt and Cr.

7. The microbridge structure with multiple corrugated regions and with reduced reflection according to claim 1 wherein said first thin film temperature responsive resistive element is Ni.

8. The microbridge structure with multiple corrugated regions and with reduced reflection according to claim 7 wherein said first thin film temperature responsive resistive element is on the order of 100 µnm in thickness.

9. The microbridge structure with multiple corrugated regions and with reduced reflection according to claim 1, in said upper microbridge detector structure, further comprising a second thin film temperature responsive resistive element formed on a second dielectric layer formed on said first thin film temperature responsive resistive element.

10. The microbridge structure with multiple corrugated regions and with reduced reflection according to claim 9 wherein said second dielectric layer is selected from the group consisting of silicon dioxide and silicon nitride.

11. The microbridge structure with multiple corrugated regions and with reduced reflection according to claim 9 wherein said second dielectric layer is silicon dioxide.

12. The microbridge structure with multiple corrugated regions and with reduced reflection according to claim 11 wherein said second dielectric layer is on the order of 0.2 µm in thickness.

13. The microbridge structure with multiple corrugated regions and with reduced reflection according to claim 9 wherein said second thin film temperature responsive resistive element is selected from the group consisting of amorphous silicon, germanium and metal oxides.

14. The microbridge structure with multiple corrugated regions and with reduced reflection according to claim 9 wherein said second thin film temperature responsive resistive element is germanium.

15. The microbridge structure with multiple corrugated regions and with reduced reflection according to claim 14 wherein said second thin film temperature responsive resistive element is on the order of 100 µnm in thickness.

* * * * *